Aug. 30, 1960 J. O. ANZONS 2,950,831

UNIVERSAL LOADER MECHANISM

Filed Nov. 18, 1957 5 Sheets-Sheet 1

INVENTOR.
JANIS O. ANZONS
BY J. Frederick Bechtel
ATTY.

Aug. 30, 1960 J. O. ANZONS 2,950,831
UNIVERSAL LOADER MECHANISM
Filed Nov. 18, 1957 5 Sheets-Sheet 2

INVENTOR.
JANIS O. ANZONS
BY J. Frederick Bechtel
ATTY.

Aug. 30, 1960 J. O. ANZONS 2,950,831

UNIVERSAL LOADER MECHANISM

Filed Nov. 18, 1957 5 Sheets-Sheet 3

INVENTOR.

JANIS O. ANZONS

BY J. Frederick Bechtold

ATTY.

UNIVERSAL LOADER MECHANISM

Filed Nov. 18, 1957 5 Sheets-Sheet 4

INVENTOR.
JANIS O. ANZONS
BY J. Fredrick Bechtel
ATTY.

Aug. 30, 1960 J. O. ANZONS 2,950,831

UNIVERSAL LOADER MECHANISM

Filed Nov. 18, 1957 5 Sheets-Sheet 5

INVENTOR.
JANIS O. ANZONS
BY J. Frederick Bechtel
ATTY.

United States Patent Office 2,950,831
Patented Aug. 30, 1960

2,950,831

UNIVERSAL LOADER MECHANISM

Janis O. Anzons, Battle Creek, Mich., assignor to Clark Equipment Company, a corporation of Michigan Filed Nov. 18, 1957, Ser. No. 697,015

14 Claims. (Cl. 214—731)

This invention relates to a universal loader mechanism for use with industrial lift trucks and the like, and more particularly to improved mounting and positional control means for a universal loader mechanism.

Heretofore, much difficulty and inconvenience has been encountered in the use of industrial trucks, for example, in narrow aisles formed between vertical stacks of materials and in other close quarters, such as is commonly found in warehouses, due to the fact that a lift truck normally must approach a load to be transported at least approximately at right angles thereto, so that between two rows of stacks there must be provided a relatively wide passage in order to make it possible for the truck to approach the load.

This invention constitutes an improvement over the invention disclosed and claimed in copending application U.S. Ser. No. 618,989 entitled "Method and Means for Employing Industrial Trucks," filed in the name of Hermann Wendt (common assignee) on October 29, 1956, with a priority under the International Convention of November 18, 1955.

The aforementioned copending application discloses an extremely significant contribution to the art wherein industrial vehicles may be employed to accomplish useful work by utilizing a semi-universal load carrier means capable of engaging a load either in front of or at either side of a truck (or at any angle therebetween). After a load is engaged, it may be actuated to any desired position ahead or at either side of the truck. However, Wendt's invention does not afford the ultimate answer to the problem of operating industrial trucks in narrow aisles, although it does make a most significant forward stride in the art.

The present invention improves upon the said prior construction by providing control mechanism for load carrier means which provides for not only all load carrier movements of which the aforementioned mechanism is capable, but also provides for movement of the load carrier from a forwarly directed position to a position at either side of the truck, as selected, without extension of the load carrier beyond the lateral dimension of the truck. In other words, a load carrier may be controlled by means of my invention to move from a forwardly directed position to a position at one side of the truck without swinging out beyond that side of the truck in executing such movement; circular swing out of such load carriers has been heretofore inherent in the use thereof.

The above desirable result has been accomplished by using relatively simple but extremely effective means which increases substantially the versatility of the prior mentioned semi-universal loader mechanism, and makes available for the first time a fully universal side and front loader attachment for industrial trucks and the like while avoiding the inherent deficiencies of various prior art devices (which are fully discussed in the aforementioned copending application).

It is therefore a primary object of the present invention to avoid the deficiencies of prior constructions by providing improved load engaging means for attachment to a vehicle which is actuatable in substantially straight-line movement and in any desired alternation toward or away from a load located either to the right or to the left of the truck.

It is another important object of this invention to provide for vehicles of the type specified improved load engaging means permitting straight-line lateral sliding movement of a load from a stack of material, and subsequent swinging of such a load in any desired alternation to the right, to the left, or in the driving direction of the truck, such swinging movements being partial if desired.

It is a further important object of this invention to provide a relatively simple, low cost and extremely novel fully universal loader mechanism for vehicles which is actuatable to the right, to the left, or in the driving direction of the vehicle, while remaining substantially within the lateral dimension of the vehicle.

Many other objects and advantages of my invention will be apparent from the following detailed description taken in conjunction with the accompanying drawings wherein:

Figure 1 diagrammatically illustrates the device of my invention in various positional phases of its available mode of operation;

Figure 1:
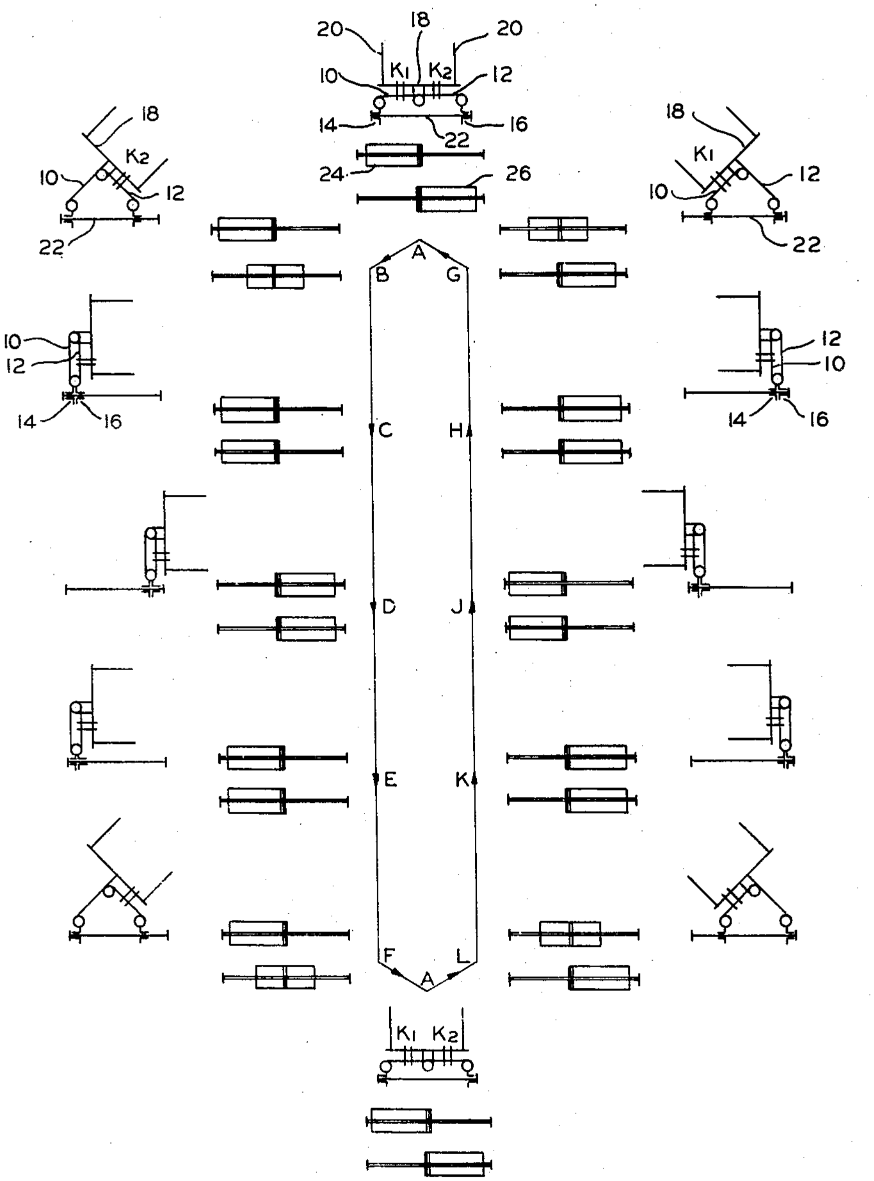

Referring now to the drawings, principal movements of my novel device not available in like sequence in the aforementioned copending application are shown in Figure 1, wherein arrow lines between various movement phases (A–F and A–G) indicate two of a plurality of possible movement combinations.

In order to execute the indicated movements, certain couplings must be made between certain movable parts of the machine. These couplings are indicated diagrammatically in Figure 1 by double lines marked K1 and K2, and, in the later description of exemplary construction, it will be explained how these couplings are obtained automatically by simple means. The over-all arrangement consists of two levers 10 and 12 which are hinged together at adjacent ends thereof, and the free ends of which are hinged to guide members 14 and 16, respectively. A load carrier or load engaging means 18 is hinged to the common joint of levers 10 and 12 and is adapted to swing horizontally. As illustrated, the load carrier comprises the usual pair of fork tines 20 which are secured to the carriage 18 in known manner. All movements of the carriage are executed as a result of movement of one or both guide members 14, 16 along a guide track 22. To facilitate understanding, there is diagrammatically illustrated adjacent each of the movement phases shown in Figure 1 a pair of hydraulic cylinder and piston assemblies 24 and 26, the piston rod of each of which is, in practice, fixedly secured to opposite ends of the guide track 22, and the cylinders of which are suitably connected to opposite ones of the guide members 14 and 16 for the purpose of actuating along the guide track 22 one or the other or both of the said guide members in a manner to be described.

Phase A of Figure 1 represents the load carrier's basic position on a lift truck, wherein the truck and load carrier can function in the usual manner. If couple $K_1$ is actuated to uncouple the left side of carriage 18 from lever 10 and the guide member 16 then moved toward guide member 14, the carriage 18 passes via the position illustrated in phase B into the position illustrated in phase C. Such movement of guide member 16 results from actuation of cylinder assembly 26 to the left side of the truck. The carriage 18 and levers 10 and 12 may now be moved together transversely to the right side of the truck by simultaneously actuating the cylinder assemblies 24 and 26 as in phase D, in which position a load may be engaged by the fork tines 20 and then moved toward the left side of the truck by actuating the cylinders together in the opposite direction (phase E). From the phase E position the carriage may be returned to its basic position via phase F, in which $K_1$ may be actuated to recouple carriage 18 to lever 10. Deposit of the load adjacent the side of the truck opposite to that at which it was engaged may be accomplished by first uncoupling couple $K_2$ and then actuating guide member 14 toward guide member 16 by means of cylinder assembly 24 (phase L), subsequent to which the cylinder assemblies may be energized in the sequence illustrated in phases K—J—H—G—A to obtain the desired sequence of movement of the carriage and fork tines.

The above described sequence of movement of the load carrier is not possible with the device of the aforementioned copending application. In addition to the above, my load carrier is capable of all possible movement combinations performable by the device of said prior application.

A principal advantage of my invention lies in the fact that with one and the same truck all possible stacking requirements can be met with a loader device which can be controlled to remain substantially within the lateral dimensions of the truck during actuation to either side of the truck, and without requiring any remounting of the carrier or exchange of any parts. For example, a lift truck which utilizes my invention may work for days or hours as a standard lift truck, then as a swinging lift truck, and finally as a side shifting lift truck, either to the right or to the left or alternately to the right and the left and straight ahead.

Figure 2:
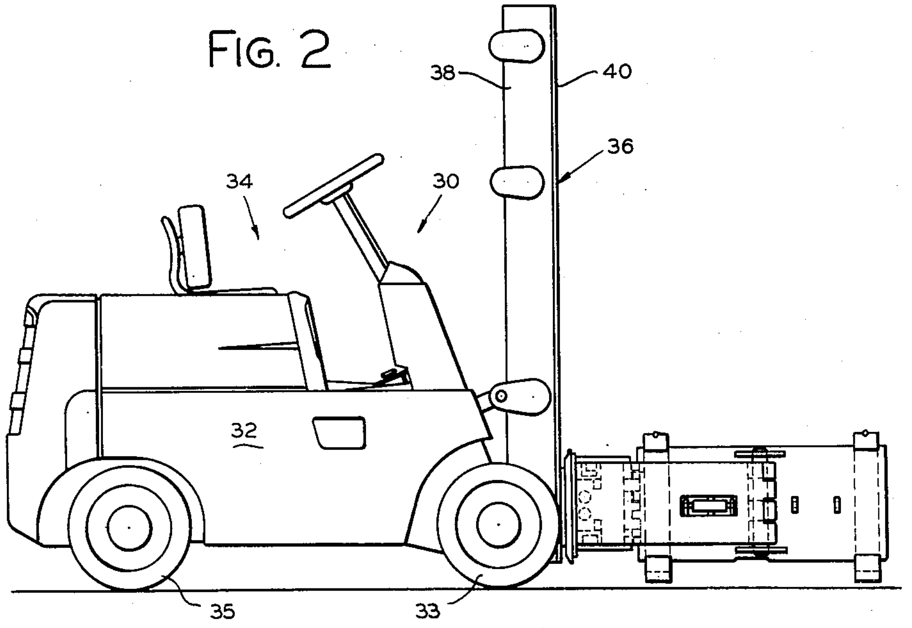
Figure 2 is a side view in elevation of an industrial lift truck having the device of my invention connected thereto and shown in a side loading position.
Figure 3:
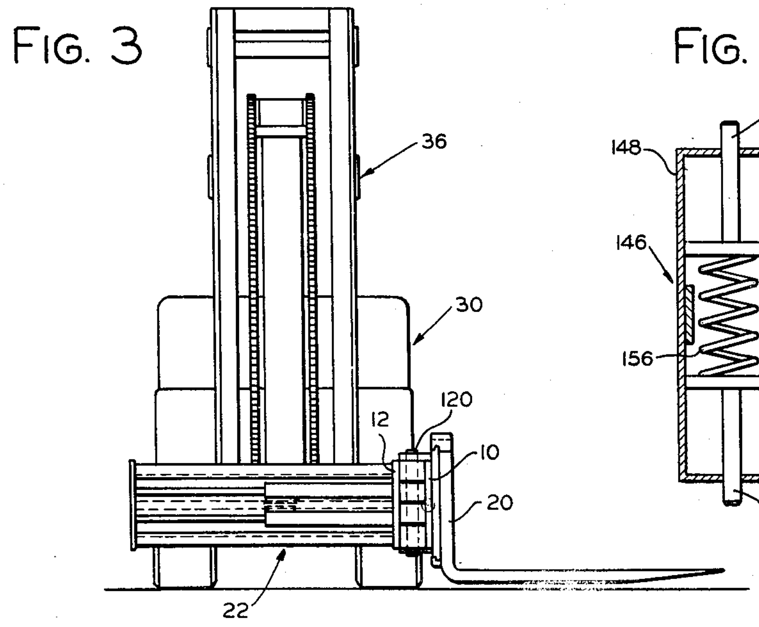
Figure 3 is a front view in elevation of Figure 2.
Figures 4, 9:
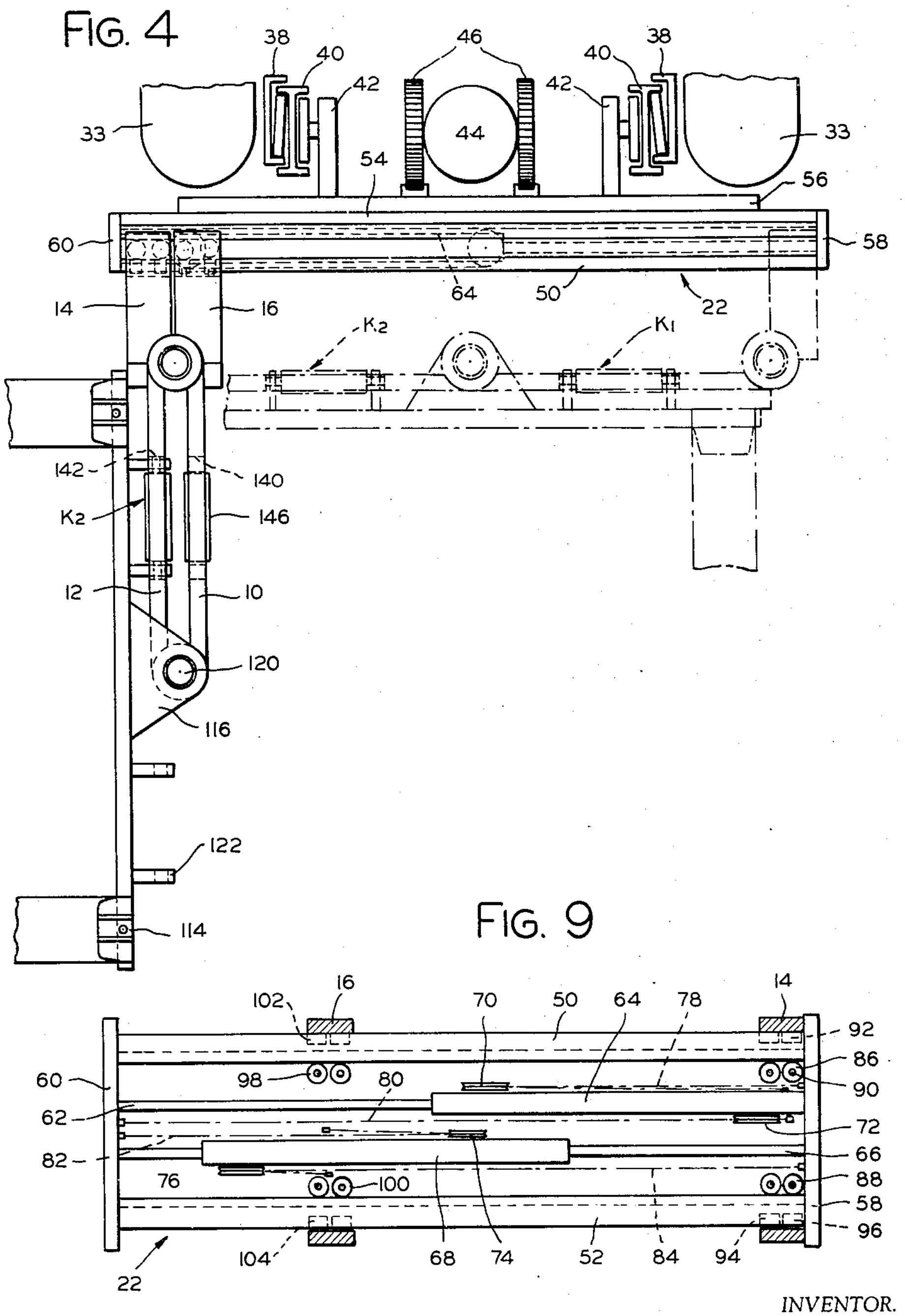
Figure 4 is a somewhat schematized plan view of my device wherein the loader mechanism is shown in front and side loading positions.
Figure 9 is a view in partial section taken along line 9—9 of Figure 4A.

Referring now to Figures 2, 3 and 4, I have indicated an industrial lift truck generally at numeral 30. My invention is well adapted for use with such a vehicle, although I do not intend that my invention be limited by the exemplary use herein described. Many other uses will occur to persons skilled in the art. This vehicle is of a well known type and includes generally a body portion 32 which is mounted on axles of a pair of front drive wheels 33 and a pair of rear steer wheels 35. An operator's station is indicated generally at numeral 34, and includes the steering wheel for operating the rear wheels of the truck, an operator's seat, and various controls, not shown, for operating the truck and the device of my invention which is associated therewith. A vertically disposed telescopic mast structure is located at the front end of the body portion of the truck and is indicated generally by numeral 36. Mast structures of the general type indicated are known and need not be described in detail herein. Generally, the mast structure 36 includes an outer guideway formed by a pair of laterally spaced channel members 38 and an inner slide structure 40 which telescopes within the outer guide structure and which is formed by a pair of laterally spaced I-beam nested within the outer guide structure. The guide member 22, which forms a part of my device, is supported for vertical movement within the inner slide structure by means of known bracket and roller assemblies 42 associated with the I-beam members of such structure. The guide member 22 is operatively connected to an hydraulic hoist motor 44 by means of lifting chains 46. Details of the mast and hoist construction are fully disclosed in copending U.S. application Serial No. 589,156, filed in the names of R. Hastings and E. R. Backofen on June 4, 1956 (common assignee).

The basic concept of the invention has already been described in connection with Figure 1. The load carrier 18, 20 is mounted about a vertical hinge or pivot connection of two levers which can swing horizontally on the hinge, the opposite ends of the levers being movable horizontally in any desired sequence on guide members which are movable transversely of a vehicle, and the load carrier being coupled as desired to either one or both of the levers. The coupling of the load carrier to either one or both levers is accomplished automatically by locking cylinder means which will be described later.

Figure 5:
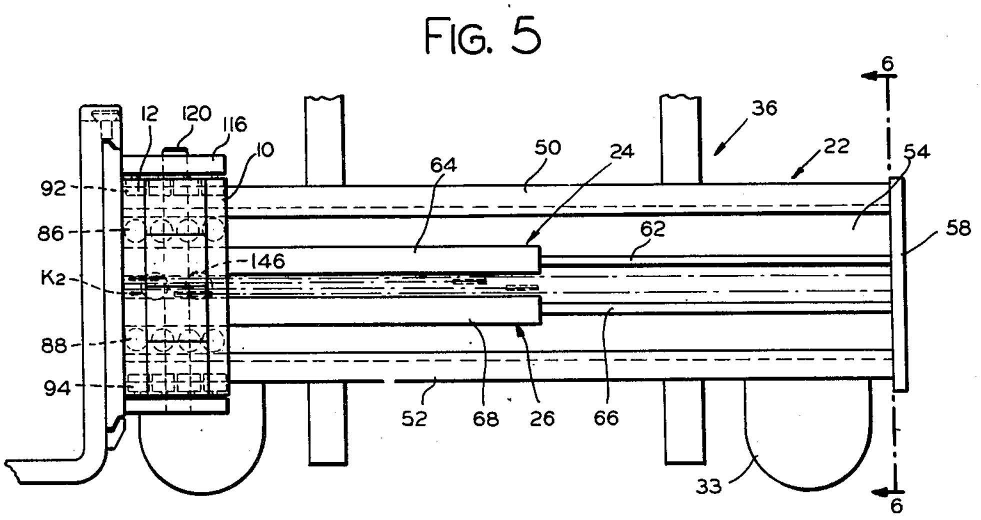
Figure 5 is a somewhat schematized front elevational view wherein the loader mechanism is illustrated in the side loading position shown in Figure 4.
Figure 6:
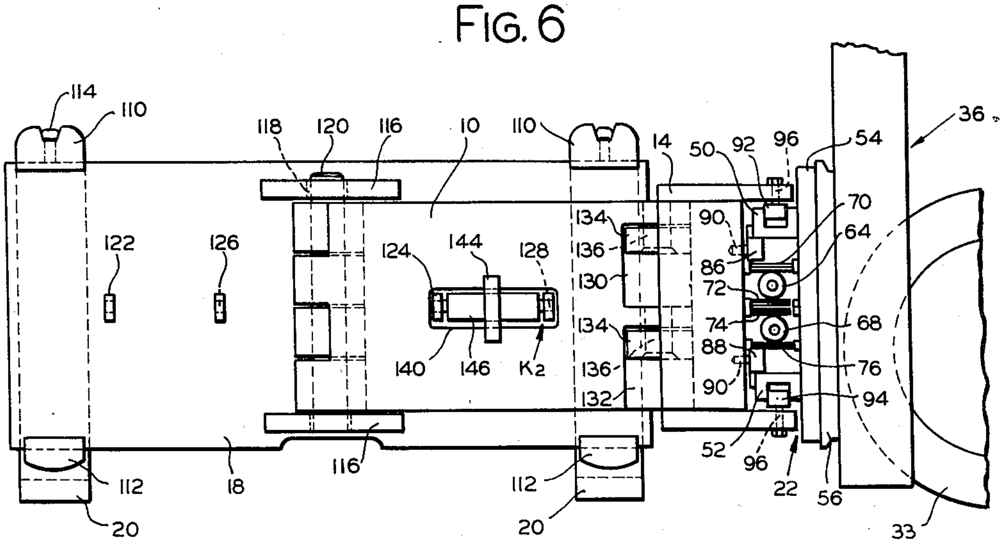
Figure 6 is a view in partial section taken along line 6—6 of Figure 5.

It is desirable that the vertical axes about which the opposite hinged ends of the levers 10 and 12 pivot will be in substantial alignment when the guide members 14 and 16 are adjacent each other, as in the side loading position of the device shown in Figures 4, 5 and 6, and that when in such position the levers 10 and 12 (which have been brought together to zero degrees) cannot swing in relation to the guide track 22. In other words, the doubled up levers 10 and 12 should function as a solid boom, which result can be obtained by means to be described latter.

Referring now to the details of Figures 4–9, the guide means 22 is comprised of a pair of vertically spaced channel members 50 and 52 extending transversely of the truck and secured, as by welding, along one leg of each channel member to a rectangular plate 54 which is in turn secured to a plate member 56, from the inner surface of which extend rearwardly the carriage bracket and roller assemblies 42. Channel member 50 opens upwardly while channel member 52 opens downwardly, adjacent ends of said channel members being connected together by means of vertically extending plate members 58 and 60.

The piston and cylinder assembly 24 comprises a fixed piston rod 62 which is secured at its opposite ends to side plates 58 and 60, and a reciprocable cylinder 64 mounted thereupon for movement axially of the piston rod 62, rod 62 having mounted centrally thereof a fixed piston head, not shown. Piston and cylinder assembly 26 comprises a piston rod 66 and cylinder 68 mounted in the same manner as piston rod 62 and cylinder 64, and located vertically beneath assembly 24.

An hydraulic system, not shown, for controlling the position and movements of cylinders 64 and 68 on piston rods 62 and 66, respectively, may comprise a plurality of flexible hydraulic conduits connected at the one ends thereof to opposite ends of cylinders 64 and 68 and at the opposite ends thereof to hydraulic pump connected selector valve means, conveniently locatable in the operator's compartment 34. The selector valve means may be of any well known type for selectively connecting either end of cylinder 64 or 68 to pump pressure while connecting the opposite end to a reservoir (from which the pump receives fluid), or for simultaneously connecting adjacent ends of both cylinders to pump pressure while connecting both opposite adjacent ends thereof to the reservoir.

Adjacent the opposite ends of each of the cylinders 64 and 68 are rotatably mounted upon opposite sides of the cylinder wall a pair of sheaves or the like (Figure 9). Sheaves 70 and 72 are rotatably mounted upon cylinder 64, and sheaves 74 and 76 upon cylinder 68. Each of the sheaves are reeved by a cable or the like which is movably anchored at one end to one of the guide members 14 and 16 and at the opposite end to one of the side plate members 58 and 60; i.e., a cable 78 of sheave 70 is suitably anchored at its opposite ends to guide member 14 and plate 58, a cable 80 of sheave 72 is anchored at its opposite ends to guide member 14 and plate 60, a cable 82 of sheave 74 is anchored at its opposite ends to guide member 16 and plate 60, and a cable 84 of sheave 76 is anchored at its opposite ends to guide member 16 and plate 58, all for a purpose to be explained.

Guide members 14 and 16 extend forwardly of the guide track 22 and are each mounted for rolling engagement therewith during movement of one or both guide members transversely of the truck. The guide member 14, for example, is mounted upon the guide track by means of upper and lower pairs of rollers 86 and 88, respectively, having horizontally extending stub shafts 90 secured to the base of the generally U-shaped guide member 14 so that the rollers engage the outer base portion of the channel members 50 and 52. In addition, upper and lower pairs of rollers 92 and 94 are connected by vertically extending stub shafts 96 to the leg portions of member 14 for rolling engagement with the leg portions of channel members 50 and 52. Guide member 16 is similarly connected to the guide track by means of roller sets 98, 100, 102 and 104. The rollers 92 and 94 of guide member 14 and the corresponding rollers of member 16 react with channel members 50 and 52 to resist longitudinally directed thrust, as well as torque in a horizontal plane, while roller sets 86 and 88 of member 14 and the corresponding rollers of member 16 react with the channel members to resist downward thrust, as well as torque in a vertical plane which results from an off-center load upon the fork tines 20.

The fork tines 20 are L-shaped for engaging loads in a well known manner, are connected to carrier plate 18 by means of upper and lower brackets 110 and 112, and are laterally adjustable along the plate 18 by an adjustment means 114 which is disclosed in detail in the copending U.S. application Ser. No. 577,595, filed in the names of E. R. Backofen and J. H. Newhouse on April 11, 1956 (common assignee). Extending rearwardly from the central portion of the carrier plate 18 are a pair of vertically spaced and generally triangularly shaped bracket members 116 having vertically aligned openings 118 for the reception of a vertically extending hinge pin 120. Extending rearwardly from the plate 18 on opposite sides of bracket members 116 are pairs of bracket members 122 and 124 having horizontally aligned openings 126 and 128, respectively.

Mounted upon the pin member 120 between brackets 116 are the registrable one ends of the pivoted levers or hinge plates 10 and 12 which are joined together by the pin 120 in fixed pivoted relation one to the other, said registrable ends of the levers with pin member 120 being of a construction generally similar to a door hinge. The opposite end of lever 10 is formed with notches 130 and 132 therein which, in the upper portion of each notch, are registrable with projections 134 which are secured to and extend forwardly of the base of the guide member 14. The projections 134 are pivotally connected to the legs of the notched portions 130 and 132 by pins 136 (Figure 6). The lever 12 is connected to guide member 16 by pins 138 (Figure 8) in the same manner as lever 10 is connected to guide member 14. The notches 130 and 132 of lever 10 and the corresponding notches of lever 12 are of such size and shape as to permit interengagement between the pivoted ends of levers 10 and 12 so that the vertical axes of pins 136 and 138 may be aligned when the levers have an angular relationship of zero degrees, whereby the levers together form a forwardly extending boom relative to the truck.

Rectangular openings 140 and 142 are formed in levers 10 and 12, respectively. A bracket 144 is secured to the forward face of each of the levers 10 and 12 centrally of openings 140 and 142 for securing within each of said openings a locking cylinder assembly 146.

Figure 7:
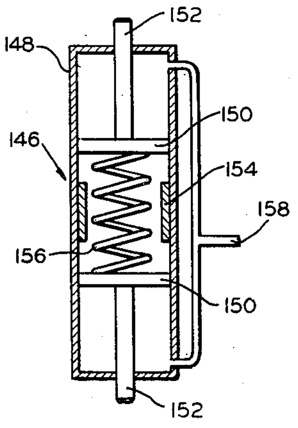
Figure 7 is a sectional detail view of a locking cylinder construction which may be used with the loader mechanism.

Referring now to Figure 7, the locking cylinder assembly 146 comprises a cylinder member 148 in which is mounted for reciprocation in opposite end portions a pair of pistons 150 having rods 152 extensible outwardly from opposite ends of the cylinder. An annular stop member 154 is secured to the inner wall of the cylinder in the central portion thereof, and a spring 156 abuts at its opposite ends pistons 150 and tends to urge the pistons toward opposite ends of the cylinder. A conduit 158 is connected to both ends of each cylinder 148, for conducting pressure fluid thereto. As will be apparent, pistons 150 are actuated inwardly of the cylinder into abutment with stop 154 whenever pressure fluid is introduced into the ends of the cylinder through conduit 158, thereby retracting rods 152. A vent 156 is provided in the cylinder between pistons 150 for returning to the reservoir any fluid which leaks past the pistons. When conduit 158 is connected to the reservoir, spring 156 will urge pistons 150 outwardly in opposite directions, thereby extending rods 152. Separate selector valve means, not shown, may be provided for convenient manipulation by the truck operator to selectively pressurize or de-pressurize one or both of cylinder assemblies 146, as desired. Such control is, of course, coordinated with the control of cylinders 64 and 68, as will be hereinafter more fully described.

The piston rods 152 of locking cylinders 146 register, when extended, with the openings in brackets 122 and 124. The couple $K_1$ comprises the one locking cylinder 146 and brackets 122, and the couple $K_2$ comprises the other locking cylinder 146 and brackets 124. The coupling means $K_1$ and $K_2$ are designated as such in the drawings only when in position to couple the load carrier 18 to one or both of the levers 10, 12.

In operation, a driver may control the truck to approach a load which is located either in the driving direction of the truck, to one or the other sides thereof, or at any angle therebetween, and by suitable manipulation of selector valve means controlling the operation of cylinder assemblies 24 and 26 and locking cylinders 146, position the fork tines to engage the load and thereafter transport same to any desired location for deposit thereof either forwardly of the truck, at either side thereof or at any angle therebetween.

For example, if the truck is operating in a very narrow aisle with the fork tines extending forwardly thereof and it is desired to engage an elevated load at one side of the vehicle and deposit same on the opposite side thereof, the truck operator first shifts the load carrier from its forward position to a transverse position at the opposite side of the truck from that on which the load is located so as to maintain the carrier substantially within the lateral dimension of the truck during swinging movement of the forks (phases A—B—C or A—L—K of Figure 1). If the load is located to the right of the truck (from the driver's position, making note of the fact that Figures 5 and 9 are taken from the front of the truck), the operator would follow through the procedure illustrated by the complete cycle of phases in Figure 1, beginning at upper phase A position and moving in a counterclockwise direction back to the upper phase A position.

Beginning at the upper phase A position, the locking cylinder 146 of coupling $K_1$ is initially energized to uncouple the load carrier from lever 10, following which the right end of side shift cylinder 68 is pressurized. The load carrier will thus remain secured to the lever 12 by coupling $K_2$ as cylinder 68 begins to traverse piston rod 66 and actuate therewith at a 2:1 movement ratio guide member 16 toward guide member 14, thereby swinging the carrier 18 inwardly toward the left side of the truck and substantially within the lateral dimension thereof. As the cylinder 68 moves into abutment with side plate 58, guide member 16 will be actuated transversely along the channels 50 and 52 by means of sheave and cable 74 and 82 into adjacency with guide member 14, in which position the ends of the levers hinged to the guide members register to form a forwardly extending boom of the levers and to dispose the load carrier in the position illustrated in phase C of Figure 1. With the fork tines 20 aligned longitudinally of the load to be engaged, both of cylinders 64 and 68 are pressurized (while maintaining coupling $K_2$ between the load carrier and lever 12) to actuate the fork tines transversely of the truck to the phase D position wherein the load is engaged. Such traversing operation of the load carrier is effected by means of sheaves and cables 70, 78 of cylinder 64 and 76, 84 of cylinder 68.

Following a lifting of the load on mast 36, the load carrier and lever-boom assemblage may be again actuated to the left side of the truck (phase E) by pressuring cylinders 64 and 68 simultaneously for leftward movement until the cylinders abut side plate 58. This causes leftward movement at a 2:1 movement ratio of the lever-boom and guide members by means of sheaves and cables 72, 74, 80, and 82. The load carrier and load may now be returned to the basic phase A position, still within the lateral dimension of the truck, by maintaining the coupling $K_2$ and pressurizing cylinder 68 to actuate guide member 16 rightwardly by means of sheave and cable 76, 84 (phase F).

In order to deposit the load at the opposite or left side of the truck, the sequence of phases A—L—K—J—H—G—A is followed. This sequence of operation is just the reverse of the aforedescribed sequence, wherein couple $K_1$ connects load carrier plate 18 to lever 10 while $K_2$ is uncoupled from lever 12. After deposit of the load and return of the load carrier to phase A position, the couple $K_2$ is deenergized to recouple locking cylinder 146 and brackets 124.

Figure 4A:
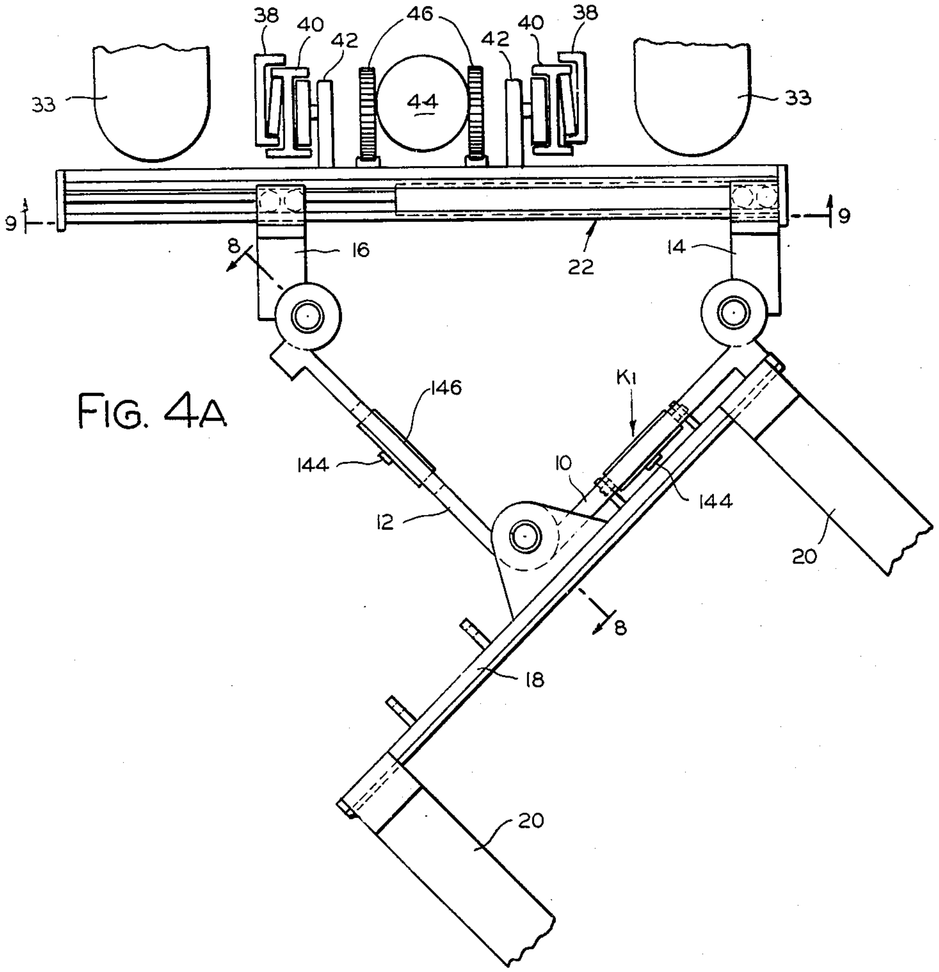
Figure 4A illustrates a plan view of the device wherein the load carrier is located intermediate its phase A and phase J positions (Figure 1) during an alternate mode of operation thereof.
Figure 8:
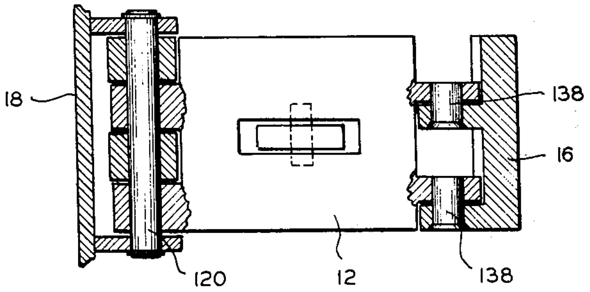
Figure 8 is a view in partial section taken along line 8—8 of Figure 4A.

In addition to the above mode of operation, assuming that the truck is operating in a somewhat wider aisle than aforementioned, the above described sequence of operation in moving the load carrier from a front to a side loading postion can be substantially simplified by substituting for phase B, for example, a phase wherein the couple $K_2$ alone is maintained, but guide member 14 is actuated into adjacency with guide member 16 instead of the reverse thereof wherein guide member 16 is actuated into adjacency with member 14, as shown in phase B. This somewhat simplified operation will eliminate phases B and C (or phases L and K of a like operation toward the opposite side of the truck) by causing the load carrier to be moved directly from the position illustrated in phase A to that illustrated in phase D. Of course, the load carrier swings somewhat beyond the lateral dimension of the truck during such simplified operation, thereby requiring a slightly wider aisle than otherwise; however; substantial time may be saved in thus working the truck. Also, in returning the carrier to its basic phase A position from a phase D position, for example, phases E and F may be eliminated by actuating guide member 14 to the left side of the truck while maintaining guide member 16 at the right side of the truck, thus returning the load carrier directly from the position illustrated in phase D to the basic phase A position. In working on the opposite side of the truck (phases L through G), the reverse of the above noted simplified procedure would, of course, be used. An intermediate step of the above outlined alternate mode of operation is illustrated in Figure 4A, wherein the load carrier is being actuated directly from the phase A to the phase J position.

All of the above described operations may be automatically performed by operator control of simple selector valves for pressurizing in any desired operable combination the couples $K_1$ and $K_2$ and the side shifting cylinder assemblies 24 and 26. Thus a completely versatile and fully universal front and side load carrier mechanism is supplied for application to all possible load stacking requirements.

Although only one embodiment of my invention has been described in detail, it will be apparent to persons skilled in the art that numerous modifications and changes may be made in the construction, form, and arrangement of parts without departing from the scope of the invention.

I claim:

1. In combination, a guide means, a pair of arms pivotally joined together at adjacent ends thereof, the opposite end of each of said lever arms being operatively connected to said guide means, said operative connection including means about which each of said arms may pivot relative to said guide means and at least one of said operation connections including a guide member, said guide member being actuatable in either direction along said guide means whereby to effect outwardly directed pivotal movement of said arms relative to said guide means, load carrier means pivotally connected to said arms adjacent the joined ends thereof, and means for securing the load carrier means to that arm which is actuatable toward and away from the other arm with movement of said guide member during movement of that arm, whereby to effect swinging movement of said load carrier means from a first to a second position.

2. An attachment for industrial vehicles comprising load support means operatively connected to the vehicle at one end thereof, a pair of lever arms connected at adjacent ends thereof for relative pivotal movement of one lever relative to the other, means operatively connecting the ends of said lever arms opposite said adjacent ends to said support means for permitting outwardly directed pivotal movement of said lever arms relative to said support means, at least one of said connecting means including means slidable along said support means for pivoting said lever arms in opposite directions about the connected adjacent ends thereof, load carrier means operatively connected to said lever arms adjacent the connected adjacent ends thereof for pivotal movement therewith, locking means for securing said load carrier means to that lever arm which is connected at its one end to said slidable means, said locking means securing the load carrier means to the latter mentioned lever during movement of said slidable means along said support means.

3. An attachment for industrial lift trucks having an upright frame located adjacent one end thereof, comprising load support means elevatable relative to the upright frame and extending transversely of the truck in a plane parallel to the plane of the upright frame, hinged means having opposite ends thereof operatively connected to the load support means for pivotal movement relative thereto, each of said opposite ends of said hinged means being selectively actuatable toward and away from the other opposite end in a direction longitudinal of said load support means and transversely of the truck, whereby when said longitudinally movable opposite end is actuated to a position adjacent the said other opposite end the hinged means functions as a boom extending longitudinally of said truck, and when said longitudinally movable opposite end is actuated to its furthermost position from said other opposite end said hinged means functions as supporting means which extends transversely of the truck and longitudinally of the load support means, load carrier means pivotally connected to adjacent hinged ends of said hinged means and extending transversely of the truck, and locking means for selectively securing one or both sides of said hinged means to one or both sides of the load carrier means, said locking means being adapted to secure the load carrier means to one side of the hinged means during actuation of the opposite end thereof in either direction longitudinally of said load support means, whereby said load carrier means is swingable from a front to a side loading position and vice versa while secured to said longitudinally moving side of the hinged means.

4. In an industrial lift truck having an upright construction located adjacent one end thereof and support means elevatable relative to the said upright construction, attachment means supported by said support means and normally extending transversely of said truck comprising means hinged intermediate of its ends and forwardly of the support means and operatively connected to the support means for pivotal movement adjacent its opposite ends, each of the pivoted end connections of said hinged means being actuatable in a direction transverse of the truck and longitudinal of said support means, said pivoted end connections being so constructed and arranged that actuation as aforesaid of one thereof is capable of effecting a variation in the included angle formed between the sides of said hinged means of 180° or less to 0° or more as either of said pivoted end connections is actuated from a position at or near one side of said support means to a position at or near the opposite side thereof, load carrier means extending forwardly of the hinged means and pivotally connected to the intermediate hinged portion thereof, and coupling means associated with each side of said hinged means and with said load carrier means for securing said load carrier means to either one or both sides of said hinged means, said coupling means being selectively and automatically controllable to secure said load carrier means to either side of said hinged means irrespective of which of the pivoted end connections of said hinged means is actuated transversely of the truck, whereby said load carrier means is swingable from a forwardly directed position to a transversely directed position at either one or the other sides of the truck as one only of the sides of the hinged means is actuated in one direction transversely of the truck.

5. For use with a stacking machine, an attachment connected to said machine adjacent one end thereof comprising means normally extending transversely of the machine mounted for pivotal movement about either opposite end of itself and constructed for breaking action intermediate its opposite ends, load carrier means, means for connecting said load carrier means to the first mentioned means adjacent the breaking location thereof and also on opposite sides of said breaking location, a selected one of said opposite ends being actuatable toward the other opposite end whereby to effect the breaking action of said first mentioned means, said connecting means being selectively controllable to secure the load carrier means to either one or the other sides of said first mentioned means during actuation of one of the opposite ends of the first mentioned means toward the other opposite end thereof.

6. An attachment as claimed in claim 5 wherein said connecting means comprises coupling means associated with said first mentioned means on opposite sides of said intermediate breaking location thereof and selectively connectible to the load carrier means either one at a time or both together in any desired alternation.

7. An attachment as claimed in claim 5 wherein said first mentioned pivotal breaking means is operatively connected at each opposite end thereof to guide means, said each opposite end being actuatable in either direction transversely of said guide means, and means associated with said guide means and operatively connected to said each opposite end for actuating same singly or simultaneously transversely of the guide means in any desired alternation.

8. An attachment as claimed in claim 7 wherein said means associated with said guide means comprises a pair of hydraulic cylinder assemblies which are operatively connected to opposite ones of said opposite ends of the first mentioned means in such a manner that one of the cylinder assemblies is operative to actuate one of said opposite ends in either direction transversely of the machine and the other cylinder assembly is operative to actuate the other of said opposite ends in either direction transversely of the machine, and said cylinder assemblies are simultaneously operative to actuate said opposite ends together transversely of the truck, said actuation by either one or both of said cylinder assemblies being selectable at will.

9. An attachment as claimed in claim 8 wherein said opposite ends are connected to said guide means by guide members having effective rolling engagement with said guide means, and said cylinder assemblies are connected to opposite ones of said guide members in a manner to effect a 2:1 movement ratio as between the guide members and portions of said cylinder assemblies.

10. For use with industrial vehicles, an attachment comprising a lever system breakable intermediate the ends thereof, either of said ends being actuatable toward or away from the other of said ends to effect either a forwardly extending boom-like structure or a transversely extending carrier structure, respectively, and said ends of said lever system being also actuatable together transverely of the vehicle following actuation of one of said opposite ends into adjacency with the other of said opposite ends to form said boom-like structure, and load carrier means coupled to said lever system in such a manner that the various selectable movements of the opposite ends of said lever system may effect a plurality of positions of the load carrier means including positions thereof extending transversely in either direction from each side of the vehicle and also forwardly in the direction of travel of the vehicle, the above positions of the load carrier means being selectable in any desired alternation, the coupling means between said load carrier means and said lever system being selectable to secure either one or the other sides of said lever system to the load carrier means during actuation in either direction transversely of the vehicle of a selected one of the opposite ends of the lever system.

11. An attachment as claimed in claim 10 wherein the coupling means comprises means secured to the lever system and means secured to the load carrier means, said latter two mentioned means being connectible one with the other for coupling one or more sides of the lever system to the load carrier means.

12. An attachment as claimed in claim 11 wherein that portion of said coupling means which is attached to a side of the lever system comprises an hydraulic cylinder and piston assembly selectively energizable to attach to or detach from the coupling means portion which is connected to the load carrier means.

13. For use with industrial lift trucks, an attachment comprising a lever system breakable intermediate the opposite ends thereof, at least one of said ends being actuatable toward or away from the other of said ends to effect a forwardly extending boom-like structure or a transversely extending carrier structure, respectively, and said opposite ends being also actuatable together transversely of the truck following actuation of one of said opposite ends into adjacency with the other of said opposite ends to form said boom-like structure, and load carrier means securable to said lever system in such a manner that the various selectable movements of the opposite ends of said lever system may effect a plurality of positions of the load carrier means, said load carrier means being securable to one side of the lever system during transverse actuation of the one opposite end of said one side toward or away from the other opposite end of the opposite side, whereby said load carrier means is pivotable from a front to a side loading position or vice versa while remaining substantially within an area at one end of the truck which does not extend laterally substantially beyond the transverse dimension of the truck.

14. An attachement as claimed in claim 13 wherein either of said opposite ends is actuatable toward or away from the other of said ends.

References Cited in the file of this patent

UNITED STATES PATENTS

| | | |
|---|---|---|
| 2,753,066 | Arnot | July 3, 1956 |
| 2,851,182 | Gehring | Sept. 9, 1958 |